July 4, 1961 M. W. CALLEN 2,991,029
AUTOMATIC AIRCRAFT CONTROL APPARATUS
Filed June 25, 1958
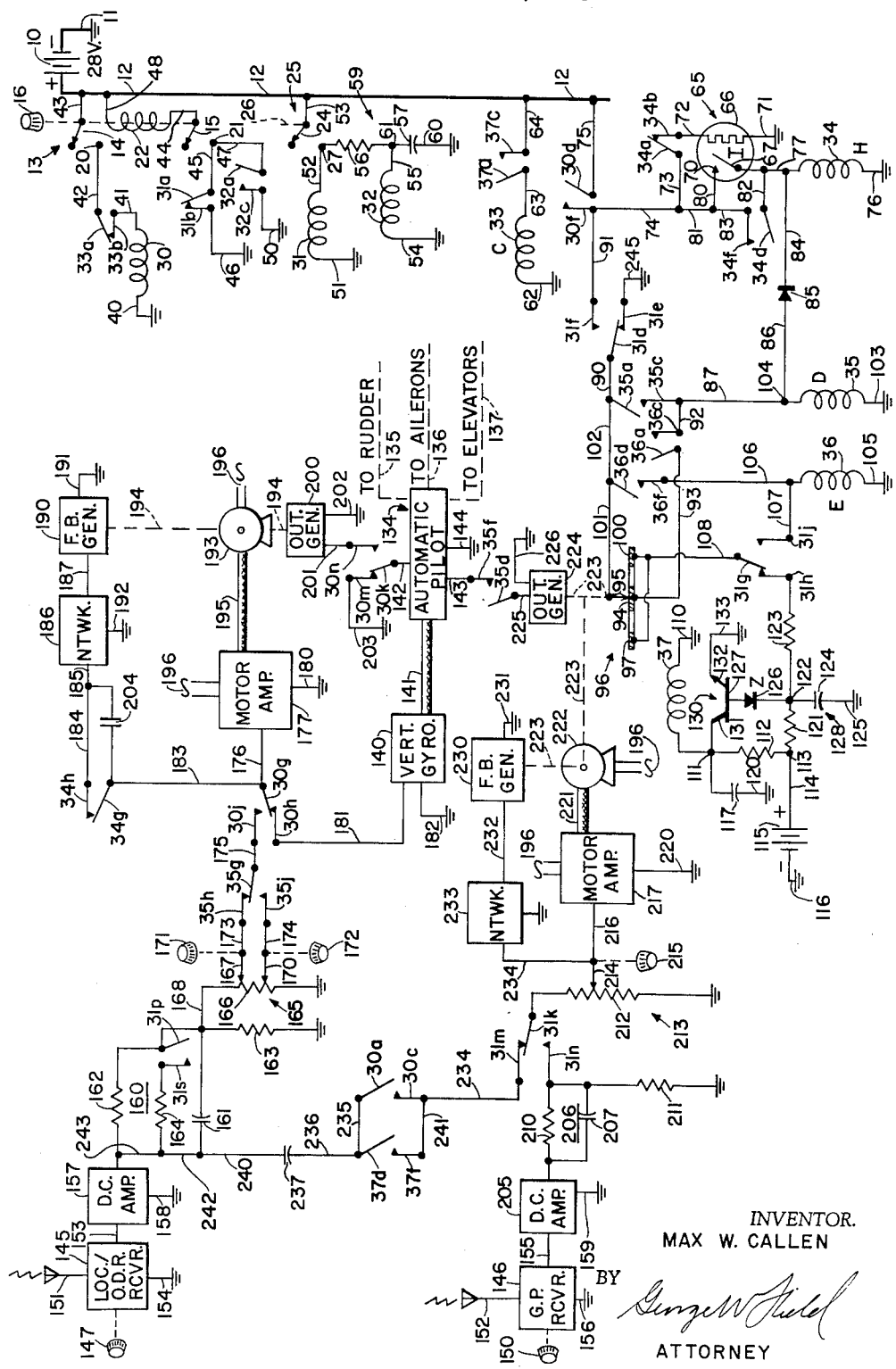
INVENTOR.
MAX W. CALLEN
BY
*George W. Field*
ATTORNEY

United States Patent Office 2,991,029
Patented July 4, 1961

2,991,029
AUTOMATIC AIRCRAFT CONTROL APPARATUS
Max W. Callen, Columbia Heights, Minn., assignor to Minneapolis-Honeywell Regulator Company, Minneapolis, Minn., a corporation of Delaware
Filed June 25, 1958, Ser. No. 744,565
7 Claims. (Cl. 244—77)

This invention relates to the field of aircraft control apparatus, and more particularly to apparatus whereby an aircraft may be guided in azimuth and elevation to follow a selected beam, passing safely through the cone of confusion above the beam transmitter, and may finally be guided in azimuth and elevation to a safe landing. A broad object of the invention is thus to provide an improved automatic aircraft control apparatus.

Another object of the invention is to provide automatic aircraft control apparatus which may safely remain engaged even while the aircraft is passing over the beam transmitter.

Another object of the invention is to provide such apparatus having a first, azimuth control channel and a second, elevation control channel, together with means making the second channel available, when the aircraft is not following a glide path beam, for use to automatically stabilize the apparatus so as to prevent undesired erratic control of the aircraft in azimuth while it is passing over the beam transmitter.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single figure of the drawing is a schematic wiring diagram of an improved aircraft control apparatus according to the invention.

In the drawing the negative terminal of the aircraft battery 10 is shown to be grounded at 11, and the positive terminal of the battery is shown to energize a positive bus 12. A Beam Guidance switch 13 is shown to comprise a pair of movable contacts 14 and 15 which may be actuated by a knob 16 into engagement with a pair of fixed contacts 20 and 21, and a holding winding 22 which is effective when energized to complete the operative connection between knob 16 and movable contacts 14 and 15. If winding 22 is not energized, knob 16 is rendered ineffective to bring the movable contacts, and contacts 14 and 15 disengage contacts 20 and 21 into engagement with the fixed contacts. One end of winding 22 is connected to positive bus 12.

Also connected to positive bus 12 is the movable contact 24 of a Localizer Engage switch 25 which may be actuated by a mechanical connection 26 into engagement with a fixed contact 27.

In addition to switches 13 and 25, the control circuitry for my invention includes a plurality of relays identified by the reference numerals 30, 31, 32, 33, 34, 35, 36, and 37 applied to their windings. For convenience in illustration the contacts actuated by these relay windings are located at different places in the drawing, and are identified by the reference numeral of the winding which operates them, together with a letter suffix.

One end of relay winding 30 is grounded at 40. The other end may be connected to positive bus 12 through conductor 41, normally engaged relay contacts 33b and 33a, conductor 42, switch contacts 20 and 14, and conductor 43.

One end of winding 22 of switch 13 is connected to positive bus 12 by conductor 48. The circuit to ground from the other end of winding 22 may be completed either through conductor 44, switch contacts 15 and 21, conductor 45, normally closed relay contacts 31a and 31b, and ground connection 46, or through conductor 44, switch contacts 15 and 21, conductor 47, normally open relay contacts 32a and 32c, and ground connection 50.

One end of relay winding 31 is grounded at 51. The other end may be connected to positive bus 12 through conductor 52, switch contacts 27 and 24, and conductor 53.

One end of relay winding 32 is grounded at 54. The other end may be connected to positive bus 12 through conductor 55, resistor 56, switch contacts 27 and 24, and conductor 53. A capacitor 57 is connected between ground at 60 and the common terminal 61 between resistor 56 and relay winding 32. Resistor 56 and capacitor 57 comprise a quarter-second time delay network 59 to insure that when switch 24 is closed relay 31 must pull in before relay 32 does so.

One end of relay winding 33 is grounded at 62. The other end may be connected to positive bus 12 through conductor 63, normally open relay contacts 37a and 37c, and conductor 64.

The control circuit also includes a time delay device 65 having a heating element 66 which may be energized to actuate a movable contact 67 into engagement with a fixed contact 70, after a predetermined interval. One end of winding 66 is grounded at 71, and the other end may be connected to positive bus 12 through conductor 72, normally closed relay contacts 34b and 34a, conductors 73 and 74, normally open relay contacts 30f and 30d, and conductor 75.

One end of relay winding 34 is grounded at 76. The other end may be connected to positive bus 12 through four paths. The first path includes conductor 77, contacts 67 and 70, conductors 80, 81, and 74, relay contacts 30f and 30d, and conductor 75. The second path includes conductors 77 and 82, normally open relay contacts 34d and 34f, conductors 83, 81, and 74, relay contacts 30f and 30d, and conductor 75. The third path includes conductor 84, a rectifier 85, conductors 86 and 87, normally open relay contacts 35c and 35a, conductor 90, normally open relay contacts 31d and 31f, conductor 91, relay contacts 30f and 30d, and conductor 75. The fourth path includes conductor 84, rectifier 85, conductors 86, 87, and 92, normally open relay contacts 36c and 36a, conductor 93, the central fixed contact 94 and the movable contact 95 of a commutator switch 96 having further end contacts 97 and 100, conductors 101, 102 and 90, relay contacts 31d and 31f, conductor 91, relay contacts 30f and 30d, and conductor 75.

One end of relay winding 35 is grounded at 103. The other end may be energized from common bus 12 through junction point 104, conductor 87, relay contacts 35c and 35a, conductor 90, relay contacts 31d and 31f, conductor 91, relay contacts 30f and 30d, and conductor 75, or through junction point 104, conductors 87 and 92, relay contacts 36c and 36a, conductor 93, switch contacts 94 and 95, conductors 101, 102 and 90, relay contacts 31d and 31f, conductor 91, relay contacts 30f and 30d, and conductor 75.

One end of relay winding 36 is grounded at 105. The other end may be connected to positive bus 12 either through conductor 106, normally open relay contacts 36f and 36d, conductors 102 and 90, relay contacts 31d and 31f, conductor 91, relay contacts 30f and 30d, and conductor 75, or through conductor 107, normally open relay contacts 31j and 31g, conductor 108, switch contacts 97, or 100, and 95, conductors 101, 102, and 90, relay contacts 31*d* and 31*f*, conductor 91, relay contacts 30*f* and 30*d*, and conductor 75.

One end of relay winding 37 is grounded at 110. The other end is connected through junction point 111, resistor 112, junction point 113, and conductor 114 to the positive terminal of a source 115 of direct voltage, the negative terminal of which is grounded at 116. A capacitor 117 is connected between junction point 111 and ground at 120.

A circuit may be traced from the positive terminal of battery 115 through conductor 114, junction point 113, a resistor 121, junction point 122 and a resistor 123 to relay contact 31*h*. A capacitor 124 is connected between junction point 122 and ground at 125 to comprise with resistor 121 a fifteen second time delay network 128.

A Zener diode 126 is connected between junction point 122 and the base 127 of an NPN transistor 130 having a collector 131 connected to junction point 111 and an emitter 132 which is grounded at 133. The forward direction of conduction of the diode is away from the transistor.

In the center of the drawing block 134 represents the automatic pilot of the aircraft, which functions to stabilize the aircraft in elevation and azimuth through mechanical connections 135, 136, and 137 to the rudder, ailerons, and elevators respectively of the aircraft. Automatic pilot 134 ordinarily includes a vertical gyroscope, but for clarity of illustration the gyroscope is shown separately at 140 in the drawing, as being connected to automatic pilot 134 by a cable 141.

The stabilizing action of automatic pilot 134 may be overridden in azimuth by a direct voltage signal applied between a first input conductor 142 and ground, and similarly it may be overridden in elevation by a direct voltage signal applied between a second input conductor 143 and ground. The common ground connection for automatic pilot 134 is shown at 144.

The apparatus provided for supplying the signals to conductors 142 and 143 of automatic pilot 134 will now be described. At the left of the drawing are shown a pair of radio receivers 145 and 146, having tuning means 147 and 150 respetcively. Receiver 145 is designed to receive at an antenna 151 the signals from Omni-Directional Range transmitters, and from the Localizer transmitters of Instrument Landing System installations, and may conveniently be of the type known as ARN-14. It supplies an output between a conductor 153 and a ground connection 154 which is representative of the lateral displacement of the aircraft from the azimuth beam of the Localizer or Omni-Range transmitter to which the receiver is turned.

Receiver 146 is designed to receive at an antenna 152 the signals transmitted from the Glide Path transmitter of a conventional Instrument Landing System, and may conveniently be of the type known as ARN-31: it supplies an output between a conductor 155 and a ground connection 156 which is representative of the vertical departure of the aircraft from the Glide Path beam transmitted from the I.L.S. station to which the receiver is tuned.

In the drawing tuning means 147 and 150 are shown as independent, for simplicity of illustration: in practice they are connected for simultaneous operation and mechanical connection 26 for switch 25 is also interlocked with them for closing the switch when receiver 145 is tuned to any frequencies in the I.L.S. range.

The output of receiver 145 comprises a direct voltage signal, and is transmitted through a D.C. amplifier 157 having a ground connection 158 to a rate insertion network 160 which is shown to comprise a capacitor 161, a plurality of resistors 162, 163 and 164, and normally open relay contacts 31*p* and 31*s*. The arrangement is such that there appears across resistor 163 a voltage which has components representative both of the magnitude of the signal from receiver 145 and of the rate of change of that signal. In the normal condition of relay 31 resistor 162 only is connected in parallel with capacitor 161, but when relay 31 is energized resistor 164 is connected in parallel with resistor 162, thus decreasing the total resistance in parallel with the capacitance and hence the proportion of rate component compared with displacement component.

The voltage across resistor 163 is supplied through a conductor 168 to a voltage divider 165 including a resistance element 166 and a pair of taps or sliders 167 and 170 which are independently adjustable by manual adjusting means 171 and 172. These sliders are connected by conductors 173 and 174 to relay contacts 35*h* and 35*j* respectively, to give a choice of larger or smaller effective gains from the rate insertion network. Movable contact 35*g* normally engages fixed contact 35*h*, and may be connected by conductor 175, normally open relay contacts 30*j* and 30*g* and conductor 176 to the input of a motor control amplifier 177 having a ground connection 180. In the deenergized condition of relay 30, the input of amplifier 177 is connected through normally closed relay contacts 30*g* and 30*h* and conductor 181 to vertical gyroscope 140, the circuit being completed through ground connection 182. There is thus supplied to amplifier 177 a direct voltage signal representative of the bank angle of the aircraft.

A further signal is supplied to motor amplifier 177 through conductor 183, normally closed relay contacts 34*g* and 34*h*, conductors 184 and 185, a filter network 186, and conductor 187 from a feedback generator 190, the interconnecting circuitry being completed by ground connections 191 and 192. Generator 190 supplies a direct voltage output between conductor 187 and ground which is determined by the extent of operation of an alternating current motor 193 to which the generator is connected by a suitable shaft 194. Motor 193 is reversibly energized through a cable 195 from motor amplifier 177, for operation in accordance with the signal between input conductor 176 and ground, alternating voltage connections 196 being provided to motor 193 and amplifier 177 for supplying motive power. Shaft 194 is extended to operate an output generator 200, which functions to supply between a conductor 201 and a ground connection 202 a direct voltage which is determined by the extent of rotation of motor 193. Automatic pilot conductor 142 may be connected to conductor 201 through normally open relay contacts 30*k* and 30*n*: movable contact 30*k* normally engages contact 30*m* which is grounded at 203.

As described, the apparatus including vertical gyroscope 140, motor amplifier 177, motor 193, and generators 190 and 200 comprises a proportioning system, and operates so that the position of motor shaft 194 is synchronized with the bank angle of the aircraft as long as relay 30 is de-energized, because the only inputs to amplifier 177 are those from vertical gyroscope 140 and generator 190. When the aircraft is level, shaft 194 is in a central position and generators 190 and 200 have zero output.

When relay contacts 34*g* and 34*h* disengage, the apparatus is converted from a displacement feedback system to a rate feedback system, and the functional result of this is to convert the apparatus into an integrator, since differentiation in the feedback loop is the functional equivalent of integration in the direct loop.

The output from glide path receiver 146 comprises a direct voltage signal and is transmitted through a DC amplifier 205 having a ground connection 159 to a rate insertion network 206, which is shown to comprise a capacitor 207 and resistors 210 and 211. The voltage across resistor 211 may be applied through normally open relay contacts 31*n* and 31*k* to the winding 212 of voltage divider 213 having a tap or slider 214 adjustable by a manual knob 215. Slider 214 is connected by a conductor 216 to a second motor control amplifier 217 like amplifier 177, having a ground connection 220 and a connection to power source 196. Amplifier 217 energizes, through a cable 221, a motor 222 like motor 193 having a power connection to source 196, and the shaft 223 of motor 222 is connected to adjust an output generator 224 which supplies a direct voltage signal, between conductor 225 and ground connection 226, determined by the rotated position of shaft 223. When relay 35 is actuated the normally open contacts 35d and 35f connect conductor 225 to autopilot input conductor 143.

Motor shaft 223 is extended to actuate movable contact 95 of commutator switch 96, and is further extended to adjust a second feedback generator 230 like generator 190, having a ground connection 231 and supplying a direct voltage output between a conductor 232 and ground which is determined by the rotated position of motor shaft 223. The signal between conductor 232 and ground is transmitted through a filter network 233 like network 186 and conductors 234 and 216 to the input to amplifier 217. The system just described is a displacement type of proportioning system like the system first described in connection with amplifier 177.

Relay contact 31m is connected through conductor 234, normally open relay contacts 30c and 30a, conductors 235 and 236, capacitor 237, and conductors 240, 242, and 243 to the output of amplifier 157, and an alternative circuit includes conductors 234 and 241, normally open relay contacts 37f and 37d, conductor 236, capacitor 237, and conductor 240.

Operation

The operation of my system will now be described. The initial condition of switches 13 and 25 and relays 30 to 37 inclusive is as shown in the figure. Alternating voltage is applied to amplifiers 177 and 217 and motors 193 and 222 from any suitable source. Sliders 167, 170 and 214 have particular positions along their windings, generators 190, 200, 224 and 230 are giving outputs determined by the rotated positions of the shafts of motors 193 and 222 at the time they were last de-energized, and the position of movable switch contact 95 is similarly random. Automatic pilot 134 is stabilizing the aircraft in roll and pitch and maintaining its heading. Electrical energy is being supplied by sources 10, 115, and 196, amplifiers 157 and 205 are energized, and vertical gyroscope 140 is supplying the necessary signals to automatic pilot 134, and is also giving a signal on conductor 181, dependent upon the bank angle of the craft.

Under these conditions the signal input to motor amplifier 177 is the sum of the voltages on conductors 181 and 183: the summing circuitry is conventional and is not shown in detail. If the sum of these two voltages is not zero, amplifier 177 energizes motor 193 for operation in a direction determined by the sense of the amplifier signal, adjusting generator 190 until the voltage on conductor 183 is equal and opposite to the voltage on conductor 181. When this condition is reached, operation of motor 193 ceases. Output generator 200 is adjusted simultaneously with feedback generator 190, but is not connected to automatic pilot 134. Now any change in the output from vertical gyroscope 140 changes the voltage input to amplifier 177 and causes further operation of motor 193. The servo system is thus "synchronized" with the bank angle of the aircraft as sensed by the vertical gyroscope 140. Since the aircraft is in generally wing-level flight, the operation of motor 193 esentially centers the equipment and produces a generally zero output from generator 200.

The only input to motor amplifier 217 is that supplied on conductor 234 from feedback generator 230. Amplifier 217 accordingly energizes motor 222 to operate so as to reduce the feedback generator signal to zero. When this is accomplished the output generator signal on conductor 225 is also zero, and movable contact 95 is at the center of contact 94.

Transistor 130 is positively biased through Zener diode 126, and is conducting heavily: the resulting voltage drop through resistor 112 reduces the potential at junction point 111 to a value which is insufficient to cause operation of relay 37.

Receiver 145 conventionally includes means, not shown, for selecting a particular radial with respect to the Omni-Directional Range transmitter for the aircraft to follow, as well as means 147 for tuning to the frequency of the particular transmitter. When it is desired to automatically follow the selected radial, the pilot guides the craft close to the desired path, as indicated by the usual cross pointer meter connected to receiver 145, and closes switch 13. This completes a circuit through relay contacts 33a and 33b to energize relay winding 30. Relay contacts 30k and 30n complete the circuit from output generator 200 to the azimuth control input conductor 142 of automatic pilot 134. Relay contacts 30g, 30h and 30j disconnect vertical gyroscope 140 from motor amplifier 177, and substitute instead the output from slider 167 of voltage divider 165, which is determined by the magnitude, sense, and rate of change of the output from amplifier 157. Motor 193 accordingly operates, adjusting generator 190 to reduce the input to amplifier 177 to zero, and at the same time adjusting generator 200 so that the output supplied thereby is representative of the signal from amplifier 157 as modified in network 160. In response to the output supplied by generator 200, automatic pilot 134 actuates the rudder and ailerons of the aircraft in a sense to cause the aircraft to approach the center of the beam.

Relay contacts 30d and 30f complete a circuit through relay contacts 34a and 34b to heater 66 of time delay device 65. After the preset heating interval of device 65, contact 67 engages 70, and relay winding 34 is energized through relay contacts 30d and 30f and time delay contacts 70 and 67. Operation of relay 34 completes its own holding circuit through relay contacts 34f and 34d, and simultaneously interrupts at relay contacts 34a and 34b the heater circuit for time delay device 65: heater 66 accordingly cools down to prepare the device for a subsequent reoperation, and contacts 67 and 70 disengage.

In one operative embodiment of the invention device 65 introduces a delay of sixty seconds between closure of switch 13 and operation of relay 34. This interval is long enough to allow the aircraft to complete its initial bracketing of the beam so that it has achieved a heading fairly close to the one it will ultimately maintain. Operation of relay 34 thereafter to disengage contacts 34g and 34h inserts capacitor 204 between network 186 and amplifier 177: instantaneously this has no effect, but the capacitor begins to charge through resistances in network 186 and amplifier 177, thus changing the voltage applied to the latter and smoothly converting the proportioning system to an integrator. Thereafter the signal from generator 200 is a function of the time integral of the sum of aircraft deviation and rate of movement relative to the beam. The position of slider 167 on winding 166 must of course be adjusted to give the system a satisfactory overall gain.

Turning now to the elevation channel of the apparatus, energization of relay 30 closes relay contacts 30a and 30c, supplying the output of amplifier 157 through capacitor 237 to relay contact 31m to voltage divider 213. The capacitor and the resistance winding of the voltage divider cooperate to comprise a differentiator, and accordingly the voltage supplied by slider 214 to motor amplifier 217 is a function of the first derivative of the voltage supplied by amplifier 157, that is, of the displacement of the aircraft from the desired beam. Motor 222 positions shaft 223 and movable contact 95 in accordance with this rate signal. Ordinarily the rate is not very large, and slider 95 is only moderately displaced from the central contact 94, or even may remain engaged therewith. However, as the aircraft approaches the "cone of confusion" over the Omni-Directional Range transmitter, the rate of change of the signal supplied by receiver 145 becomes greater, and slider 95 is displaced further from center: when the rate exceeds the predetermined magnitude in one sense or the other, slider 95 is displaced far enough to engage either contact 97 or contact 100. When this takes place junction point 122 is grounded through load resistance 123, relay contacts 31h and 31g, conductor 108, fixed contact 97 or fixed contact 100, movable contact 95, conductors 101, 102 and 90, relay contacts 31d and 31e, and ground connection 245. The potential at junction point 122 accordingly drops below the value necessary to bias transistor 130 into a highly conductive state through Zener diode 126, and the transistor ceases to conduct. The voltage at junction point 111 accordingly rises to a value sufficient to energize relay winding 37, and the relay pulls in. Relay contacts 37d and 37f come into engagement in parallel with relay contacts 30a and 30c, and relay contacts 37a and 37c engage to energize relay 33. Relay contacts 33a and 33b disengage, to de-energize relay winding 30.

Relay contacts 30k, 30m, and 30n disconnect conductor 142 from generator 200 and ground the conductor, to make automatic pilot 134 independent of generator 200. Relay contacts 30g, 30h, and 30j cut off the signal at receiver 145 from amplifier 177 and substitutes therefor the signal from vertical gyroscope 140. Relay csontacts 30a and 30c become disengaged, but the rate circuit to voltage divider 213 is maintained through relay contacts 37d and 37f. Relay contacts 30d and 30f open to de-energize relay 34, which accordingly opens its own holding circuit at contacts 34d and 34f, completes a preparatory circuit for heater 66 of time delay device 65 at relay contacts 34a and 34b, and short circuits capacitor 204 at relay contacts 34g and 34h to restore it to its initial condition.

The result of this is to restore the automatic pilot to control of the aircraft without any additional signal from generator 200, and to re-establish the synchronizing condition of motor 193 in which generators 190 and 200 are continuously maintained in positions determined by the output from vertical gyroscope 140. At the same time motor 222 continues to be operated in accordance with the rate of change of the voltage output from amplifier 157, and movable contact 95 is positioned accordingly. Switch 13 remains closed throughout this operation.

One of the characteristics of flight through the cone of confusion over a transmitter is wide and rapid variations and reversals in the signal output from receiver 145, and therefore in the rate signal supplied to amplifier 217. As a result of these variations, movable contact 95 moves in respect to contacts 97 and 100, disengaging and re-engaging the contacts repeatedly. Each time that the movable contact disengages a fixed contact, junction point 122 is ungrounded, and the voltage at this point starts to rise toward the potential of source 115, following the charging curve of capacitor 124 through resistor 121. The values of these components are so chosen that it takes 15 seconds after movable contact 95 leaves engagement with fixed contact 97 or fixed contact 100 before the voltage at junction point 122 becomes large enough to cause discharge of Zener diode 126. Accordingly as long as the aircraft is in the cone of confusion, and movable contact 95 moves out of and into engagement with either of its fixed contacts, transistor 130 is maintained in a low conducting state, and relay winding 37 is energized. However, after the cone of confusion has passed, movable contact 95 moves permanently out of engagement with either of the fixed contacts, capacitor 124 charges from source 115 through resistor 121, and the potential of junction point 122 rises exponentially. When this junction point reaches a potential determined by the selection of Zener diode 126, the diode conducts, biasing transistor 130 to discharge again, and the voltage at junction point 111 drops below that necessary to maintain relay 37 in operation. Relay 37 drops out, energizing relay 33 through relay contacts 37a and 37c, and relay 33 in turn energizes relay winding 30 through contacts 33a and 33b, because the beam guidance switch 13 has not been opened. Normal automatic beam guidance control is re-established.

The interrelationship between relays 37, 33 and 30 results in an additional safety feature which will now be described. Operation of motor 222 is independent of whether or not switch 13 is closed, so that if the pilot should erroneously attempt to establish automatic beam guidance of the aircraft while it is over a cone of confusion, movable contact 95 will have engaged fixed contact 97 or fixed contact 100 to cause energization of relay 37, and the resulting operation of relay 33 disables relay 30 at contacts 33a and 33b, so that no beam guidance operation can be initiated.

If it is desired to return to normal autopilot flight at any time, it is necessary only to operate switch 13 to its open position, when automatic beam guidance control is interrupted.

At the end of a flight it is customary to transfer control of the aircraft from an Omni-Directional Range station to an I.L.S. station, for the final phases of the landing. At this time it is necessary to tune receivers 145 and 146 to the frequencies of the I.L.S. transmitters. Furthermore, although the aircraft may be exactly on the center of the Omni-Directional Range beam at the time the change-over is to be made, the same position of the aircraft may be considerably displaced from the center of the localizer beam. The glide path signal at this time is usually large.

When it is desired to transfer from Omni-Directional Range control to Localizer control, the human pilot adjusts receivers 145 and 146 to the appropriate I.L.S. frequency, and closes switch 25, energizing relay winding 31 immediately, and energizing relay winding 32 after a delay of about a quarter of a second. Relay contacts 31a and 31b open to de-energize the hold winding 22 of the beam guidance switch 13, which accordingly drops out. Relay contacts 30a and 30c cut off the circuit from differentiating capacitor 237 to voltage divider 213. Relay contacts 30d and 30f de-energize the winding of relay 34, which drops out. Relay contacts 30g, 30h and 30j cut off amplifier 177 from voltage divider 165, and connect the amplifier instead to receive the output from vertical gyroscope 140. Relay contacts 30k, 30m and 30n cut off automatic pilot 134 from output generator 200, and ground the automatic pilot at 203.

De-energization of relay 34 completes at relay contacts 34a and 34b the preparatory circuit for heater 66 of time delay device 65. Relay contacts 34g and 34h close to short circuit capacitor 204, and relay contacts 34d and 34f open to interrupt the holding circuit for relay 34.

Energization of relay 31 is effective at contacts 31d, 31e, and 31f to unground movable commutator contact 95 and connect it instead to conductor 91 in preparation for energization from positive bus 12. Relay contacts 31g, 31h and 31j disconnect fixed contacts 97 and 100 from junction point 122 and connect them instead to the upper terminal of relay winding 36. Relay contacts 31k, 31m and 31n disconnect voltage divider 213 from the circuit leading to capacitor 237, and connect the voltage divider instead to network 206, in preparation for vertical control of the aircraft from receiver 146. Motor 222 starts driving generator 230 toward the end of its range and generator 224 is adjusted at the same time. Relay contacts 31p and 31s close to connect resistor 164 in parallel with resistor 162, thus changing the ratio of rate to displacement signals supplied to voltage divider 165. Relay winding 37 is now permanently disabled because terminal 122 can never be grounded, and accordingly relay windings 33 cannot be energized by relay contacts 37a and 37c. Accordingly, when beam guidance switch 13 can again be closed, relay winding 30 cannot be disabled by relay contacts 33a and 33b.

After an interval of about a quarter of a second relay 32 pulls in, closing relay contacts 32a and 32c, and thus making it possible to complete the circuit for holding winding 22 of switch 13 when that switch is closed, which may now be done. Operation of motor 222 continues until movable contact 95 engages fixed contact 97. A circuit is now completed from positive bus 12 through relay contacts 30d and 30f, relay contacts 31f and 31d, switch contacts 95 and 97, and relay contacts 31g and 31j to relay winding 36. Relay 36 accordingly pulls in, completing its own holding circuit at relay contacts 36d and 36f, and also closing relay contacts 36a and 36c. Relay contact 36a is disconnected from conductor 101, however, because of the displacement of movable contact 95 from fixed contact 94, and relay 35 is not energized. Relay winding 35 was not earlier energized at the same time that relay winding 34 was energized through device 65, because of the action of rectifier 85, which prevents the flow of current from relay 34 to relay 35.

Closing switch 13 energizes relay 30, and relay contacts 30a and 30c close as before, but capacitor 237 is cut off from voltage divider 213 at relay contacts 31k and 31m, and no change in the circuit is therefore produced. Relay contacts 30d and 30f close, initiating heating of time delay device 65 as previously described, and also connecting positive bus 12 to relay contact 36a, through commutator switch contacts 94 and 95, for subsequent energization of relay winding 35. Relay contacts 30g, 30h, and 30j disconnect amplifier 177 from vertical gyroscope 140 and connect the amplifier instead to the output of slider 167: during the time that the beam guidance switch 13 was not closed, the automatic pilot was operating solely to stabilize the aircraft about its roll, pitch and yaw axes, and motor 193 was being adjusted to synchronize generator 200 with the output of vertical gyroscope 140, but now that relay contacts 30g and 30j are in engagement motor 193 is adjusted to a position in which output generator 200 supplies a signal representative of the departure of the aircraft from the Localizer beam.

During the sixty second interval required for time delay device 65 to heat up for operation, the signal from output generator 200 is supplied to automatic pilot 134, and the rudder and ailerons of the aircraft are operated to initiate correction of the position of the aircraft, so that the Localizer beam is bracketed. At the end of the sixty second interval contacts 70 and 67 come into engagement, energizing relay winding 34: as before this relay completes its own holding circuit at contacts 34d and 34f, de-energizes heater 66 at contacts 34a and 34b, and unshorts capacitor 204 at contacts 34g and 34h. The desired integral control of the aircraft in azimuth is thus completely re-established.

As flight of the craft under I.L.S. control continues, the craft comes closer and closer to the center of the glide path beam, and movable contact 95 returns toward its center contact, disengaging fixed contact 97. When the craft is near the center of the beam, movable contact 95 again engages fixed contact 94, completing the circuit to energize relay windings 35 through contacts 36a and 36c. Relay 35 operates, completing its own holding circuit at relay contacts 35a and 35c. Relay contacts 35d and 35f connect output generator 224 to input conductor 143 of automatic pilot 134, so that automatic control of the elevators of the craft in accordance with the glide path signal is established. Relay contacts 35g, 35h, and 35j disconnect motor amplifier 177 from slider 167, and connect it instead to slider 170, so that the effective gain of the azimuth control system is reduced: this is desirable because the aircraft is coming very close to the Localizer transmitter, and the Localizer beam is convergent.

Full automatic control of the aircraft about all three axes in accordance with the Localizer and Glide Path transmitters of the instrument landing system has now been established, and the craft proceeds to make an automatic landing.

Rectifier 85 is provided as an additional precaution, and its purpose will now be explained. It is conceivable that after closing the Localizer switch 25, the human pilot may neglect to again close Beam Guidance switch 13 until the aircraft has come very close to the center of the guide path beam. If the beam guidance switch is then closed, it would normally require the sixty second delay of time device 65 before relay 34 could be energized, and it could be that the aircraft has come close enough to the center of the beam so that movable contact 95 would engage fixed contact 94 before relay 34 pulled in. However, when relay winding 35 is energized, a circuit may be traced from junction point 104 through conductor 86, rectifier 85 and conductor 84 to relay winding 34, and therefore if this relay has not heretofore been energized, it is energized upon energization of relay winding 35, thus providing an additional safety feature in the system. The importance of having relay 34 energized at least as soon as contacts 94 and 95 engage is that relay contacts 34g and 34h initiate integration in the azimuth channel.

One of the features of the invention will now be apparent. Ordinarily in coupling units for connecting radio equipment with automatic pilots the glide path channel is used only during the final approach to the landing. In my equipment the glide path channel of the coupler is used for stabilizing the aircraft during passage through the cone of confusion, so that a considerable reduction in weight and a considerably increased efficiency in the use of the equipment carried by the airplane results.

Numerous objects and advantages of my invention have been set forth in the foregoing description, together with details of the structure and function of the invention, and the novel features thereof are pointed out in the appended claims. The disclosure, however, is illustrative only, and I may make changes in detail, within the principle of the invention, to the full extent indicated by the broad general meaning of the terms in which the appended claims are expressed.

I claim as my invention:

1. In combination: a motor; a control signal generator driven by said motor; signal responsive means energizing said motor; feedback means, including a generator driven by said motor, supplying a first signal to said signal responsive means; course error signal means; bank angle signal means; first switching means connected to said signal responsive means for normally supplying thereto the bank angle signal, and operable to substitute therefor the course error signal; second switching means operable to supply the control signal as an output; a time element; third switching means inserting said time element into said feedback means so that said signal responsive means is thereby converted to an integrator; means causing operation of said first and second switching means; and time delay means energized by said last named means for causing operation of said third switching means after a predetermined interval.

2. In an approach coupler, in combination: means giving a first signal determined by the lateral departure of an aircraft from a desired course; means deriving from said first signal a second signal determined by the magnitude and rate of change of said first signal; means giving a third signal determined by the bank angle of the aircraft; first signal responsive means supplying a first output to control the aircraft in azimuth; means deriving from said first signal a fourth signal determined by the rate of change of said first signal; means giving a fifth signal determined by the vertical departure of the aircraft from the desired course; second signal responsive means for supplying a second output to control the aircraft in elevation; commutator means driven by said last named means and including a central contact, which is engaged when the signal supplied to said second signal responsive means is substantially zero, and a pair of extreme contacts which are engaged when the signal supplied to said second signal responsive means reaches selected values of opposite senses; first switching means having an operated condition in which said second signal is supplied to said first signal responsive means and said fourth signal is supplied to said second signal responsive means, and a normal condition in which said third signal is supplied to said first signal responsive means and said fourth signal is cut off from said second signal responsive means; means connected to said commutator means for putting said first switching means in said normal condition, and for independently connecting said fourth signal to said second signal responsive means when either of said extreme contacts of said commutator means is engaged; second switching means operable to isolate said second signal responsive means from said first switching means and to supply said fifth signal to said second signal responsive means; third switching means normally preventing said second signal responsive means from supplying its output; and means including said second switching means and said center contact of said commutator means for actuating said third switching means, when said center contact is engaged, to enable said second signal responsive means to supply its output.

3. Apparatus according to claim 2 and means effective when said second switching means is not operated to maintain said first switching means in said normal condition for a predetermined interval after disengagement of said extreme contact takes place.

4. In combination: a motor operable through a range of normal positions to an extreme position; means for causing operation of said motor to a position determined by a rate signal; means for causing operation of said motor to a position determined by a combined displacement and rate signal; switch means for connecting a desired one of the two last named means to control said motor; and commutator means actuated by said motor to complete a first circuit when said motor is in a normal position and to complete a second circuit when said motor is in an extreme position.

5. In combination: a motor operable between extreme positions through a range of normal positions; means for causing operation of said motor to a position determined by a rate of change of lateral displacement signal; means for causing operation of said motor to a position determined by a combined vertical displacement and vertical rate signal; switch means for connecting a desired one of the two last named means to control said motor; and commutator means actuated by said motor to complete a first circuit when said motor is in a normal position and to complete a second circuit when said motor is in an extreme position.

6. In combination: a motor operable through a range of normal positions to an extreme position; means for causing operation of said motor to a position determined by a rate signal; means for causing operating of said motor to a position determined by a combined displacement and rate signal; switch means for connecting a desired one of the two last named means to control said motor; commutator means actuated by said motor to complete a first circuit when said motor is in a normal position, and to complete a second circuit when said motor is in an extreme position; lateral and vertical control means, means for disabling said lateral control means when said commutator completes said second circuit; and means for enabling said vertical control means when said commutator completes said first circuit.

7. Apparatus of the class described comprising in combination: a glide coupler comprising a motor operable through a range of normal positions including a zero position, between extreme positions, an output signal generator driven by said motor, motor control means causing operation of said motor from a zero position to an extent determined by the magnitude of an input signal, and a commutator driven by said motor and including a central contact which completes a first circuit when said motor is in said zero position and a remote contact which completes a second circuit when said motor is in an extreme position; means initially energizing said motor control means with a signal representative of the rate of change of a lateral displacement signal; means disabling said last named means when said second circuit is completed; means ultimately energizing said motor control means with a signal representative of the magnitude and rate of change of a vertical displacement signal; a utilization device; and means connecting said output signal generator to said utilization device when said first circuit is completed.

References Cited in the file of this patent

UNITED STATES PATENTS

| | | |
|---|---|---|
| 2,681,777 | Rossire | June 22, 1954 |
| 2,709,053 | Pine | May 24, 1955 |
| 2,762,962 | Meredith et al. | Sept. 11, 1956 |
| 2,881,992 | Hecht et al. | Apr. 14, 1959 |